April 6, 1937.   O. MINTON   2,076,382
HEATING, LIGHTING, AND POWER SYSTEM
Filed Sept. 29, 1934
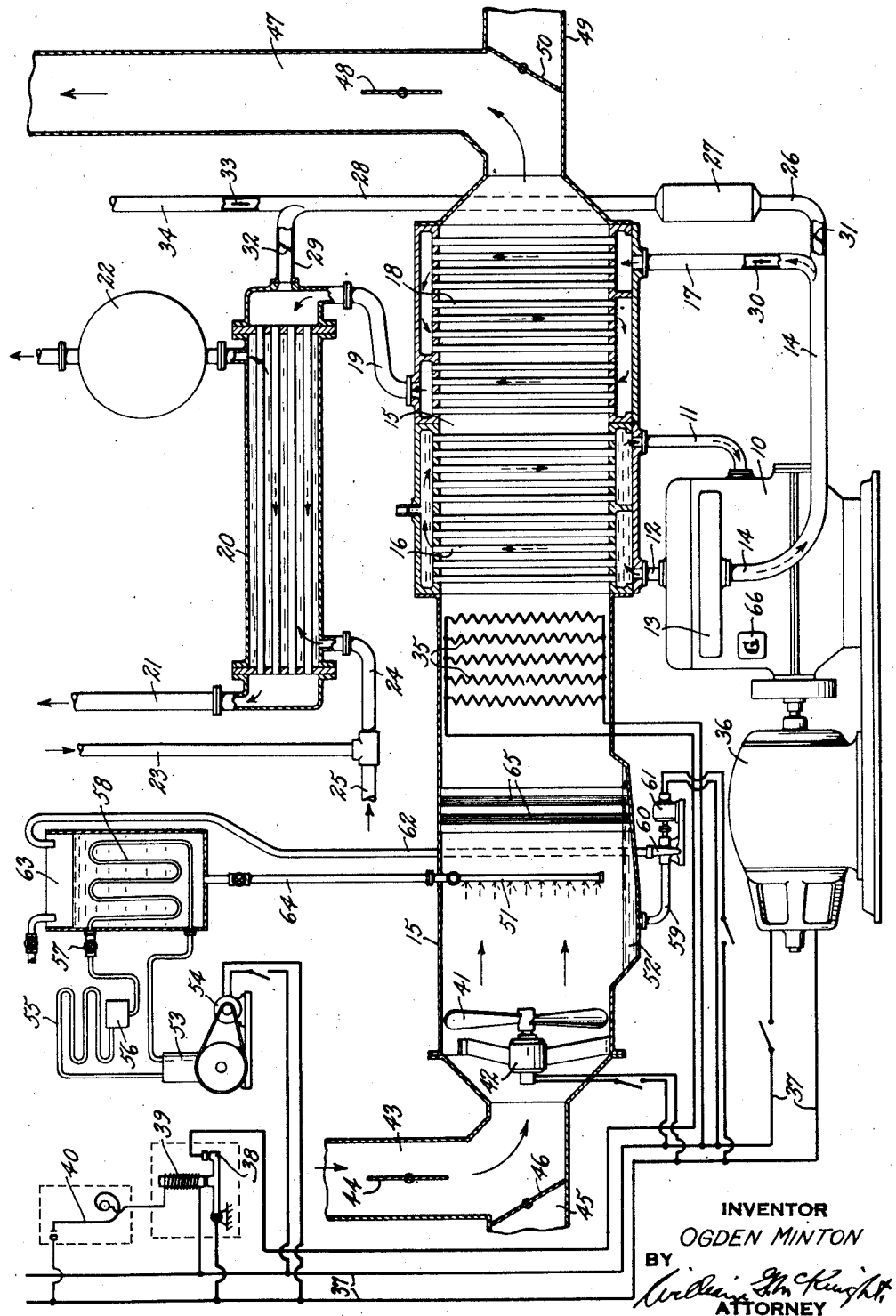
INVENTOR
OGDEN MINTON
BY
ATTORNEY Patented Apr. 6, 1937

2,076,382

UNITED STATES PATENT OFFICE 2,076,382

HEATING, LIGHTING, AND POWER SYSTEM

Ogden Minton, Greenwich, Conn.

Application September 29, 1934, Serial No. 746,049

24 Claims. (Cl. 290—2)

This invention relates to heating, lighting and power systems and provides an economical and efficient system which may be operated on low grade fuel to furnish the energy necessary for the heating, lighting and power requirements and the air conditioning of homes, office buildings and other places where needed.

The nature of the invention will be understood from the following description considered in connection with the accompanying drawing showing more or less diagrammatically a heating, lighting, power and air conditioning system embodying the invention.

Referring to the drawing, 10 designates an internal combustion engine of the Diesel type which will operate efficiently on a low grade of fuel oil such as No. 4 furnace oil. The engine is water cooled and water is supplied to the jackets of the engine through pipe 11 and is withdrawn through pipe 12. The hot exhaust gases are delivered by the engine to a manifold 13 and thence to an exhaust pipe 14.

In the system shown, the house or other enclosure is heated by hot air and the air is heated to the desired degree in a heating duct 15 either by the hot water from the water jackets of the engine 10 or by the hot exhaust gases produced thereby, or both, depending upon the temperature to be attained. To this end, the hot water from the water jackets is delivered through pipe 12 to a tubular heat exchanger 16 disposed in the duct 15 and after flowing therethrough is returned in a cooled condition to the engine water jackets through pipe 11. In the event it is not desired to heat the air in duct 15 by the water circulating through the engine, the water may be short circuited, around the heat exchanger 16 or may be cooled in any convenient way. The hot exhaust gases are passed through pipes 14 and 17 into a tubular heat exchanger 18 also disposed in the duct 15. After passing through the exchanger 18, the exhaust gases are delivered through a pipe 19 to a heat exchanger 20 and after flowing therethrough, pass through a pipe 21 to a chimney or stack. Exchanger 20 may be utilized to heat water for domestic or other purposes and as shown, is disposed in a typical domestic hot water circulating system including a storage tank 22 and return pipes 23 and 24. Incoming cold water or make-up water may be supplied through pipe 25. Should it be desired to by-pass any part or all of the exhaust gases around the exchangers 18 and/or 20, this may be accomplished by passing them through pipe 26, muffler 27 and pipe 28 from which they may be delivered to pipe 29 and exchanger 20, or, they may be passed through pipe 34 which will deliver the gases to a chimney or stack or to the atmosphere. Suitable valves 30, 31, 32 and 33 in pipes 17, 26, 29 and 34 respectively, may be adjusted to provide the flow of exhaust gases desired.

Additional means for heating the air flowing through duct 15 is provided by the electric resistance coils 35. The current for these coils is supplied by a generator 36 which is driven by the engine 10. The generator supplies current to the main line 37 and should be of sufficient capacity to furnish the current necessary for all lighting and power requirements. As shown, the heating coils 35 are thermostatically controlled through a relay controlled switch 38. The relay 39 which controls the switch 38 is in turn controlled by a thermostat 40, of the bi-metallic or other suitable type, which may be located in the enclosure to which the air from duct 15 is supplied, or at any other convenient place. Other suitable means may be employed for controlling the heat supplied by the resistance coils 35.

An air circulating fan 41 may be disposed in the inlet end of the duct 15. The fan may be driven by an electric motor 42, the current for which is supplied by generator 36. Circulated air enters the duct 15 through conduit 43, controlled by valve 44 and air from the atmosphere is supplied through duct 45 controlled by valve 46. After passing through duct 15, the air is delivered to the house or other enclosure through duct 47 controlled by valve 48, or any part or all of the air issuing from duct 15 may be delivered to the atmosphere through duct 49 controlled by valve 50.

The air flowing through duct 15, may also be conditioned in accordance with this invention. For this purpose, water at the proper temperature is sprayed from sprays 51 into contact with the air. The water may be collected in a sump 52 in the duct 15 and any suitable refrigerating system may be utilized to cool the water. An expansion-compression refrigeration system is shown which comprises a compressor 53, driven by an electric motor 54, the current for which is supplied by generator 36, condenser 55, receiver 56, expansion valve 57 and expansion or cooling coil 58 and the necessary connecting piping. Water from sump 52 is withdrawn through pipe 59 and is forced by pump 60, which may be driven by an electric motor 61 the current for which is supplied by generator 36, through pipe 62 into cooling tank 63, whence it is delivered through pipe 64 to the sprays 51. Baffles 65 serve to disentrain any excess moisture carried by the air passing over the baffles.

The engine 10 is preferably run at a constant or substantially constant speed, for example at 1200 R. P. M. and the generator 36 is preferably a constant or substantially constant voltage generator. Engine governor 66 which may be of the centrifugal ball type will control the injection of fuel into the several combustion chambers of the engine in response to the load on the generator so that a substantially constant speed is maintained. With this arrangement, so far as the heating of the house or other enclosure is concerned, the engine is controlled by the thermostat 40 which controls the heating coils 35 and consequently the load on the generator and the engine. If the action of the governor is such that there is a falling off in the speed of the engine when the load drops from full load to zero, the generator may be over-compounded to compensate for this difference in speed, so that a constant voltage will be delivered by the generator at all loads without the use of a voltage regulator.

The operation of the system disclosed is controlled by the thermostat 40 so that when the temperature of the house or other enclosure drops below the temperature for which the thermostat is set, electric energy is supplied to the coils 35 in the heating duct 15. In consequence, the load on the engine 10 is increased and the quantity and temperature of the exhaust gases produced by the engine greatly increases immediately and the temperature of the water in the water jackets of the engine also greatly increases and this increase in thermal units produced by the engine is utilized to heat the air flowing through duct 15 and to heat the water passing through the heat exchanger 20. As soon as the temperature in the house or other enclosure rises to the desired point, thermostat 40 automatically opens the relay switch 38 which cuts off the supply of current to the resistance coils 35. The load on engine 10 is then reduced and the quantity and temperature of the exhaust gases is reduced and the temperature of the water in the water jackets is lowered so that less heat is transferred to the air through heat exchanger 16 and to the water flowing through heat exchanger 20. With no load on the generator 36 the heat generated by the engine 10 ordinarily will be found sufficient to heat water for domestic hot water requirements.

Due to the fact that the exhaust gases from a Diesel type engine are very hot, ordinarily over 1000° F., it is possible to design a very efficient heat exchanger that is small in size and cost. After passing through the heat exchanger the exhaust gases are conducted to a chimney or stack and are preferably kept above 300° F., to avoid condensation and the formation of destructive acids. The gases in passing through the heat exchanger contract greatly in volume so that the heat exchanger acts as a very efficient muffler.

The only heat loss in the system, excluding friction loss, is in the heat in the exhaust gases which pass up the chimney or stack but this loss is ordinarily less than 30% of the total heat in the exhaust gases and since these gases contain only about 33% of the total heat derived from the burning of the engine fuel, the actual total loss is less than 10% of the total heat produced.

The system herein disclosed will heat an ordinary house and will consume only about one-half of the amount of fuel oil used by present day oil burners and in addition will supply the house with sufficient electrical energy for lighting, cooking and all other purposes, including the electric power necessary to operate a compressor for a compression-expansion refrigerating system to condition the air for the house. The system additionally makes the house owner independent of break down in power lines.

Inasmuch as variations in the form, location and arrangement of the several parts of the heating, lighting, power and air conditioning system disclosed herein may be made without departing from the principles of the invention, it is understood that no intention is entertained to limit the invention except by the scope of the appended claims.

What I claim is:

1. A heating system of the character described comprising an air duct connected to the atmosphere in an enclosure, means for causing air to flow from the enclosure through the air duct and to return to the enclosure, a water heater, an internal combustion engine, an electric generator driven by the engine, a first heat exchanger in the air duct, means for passing water from the water jackets of the engine through said heat exchanger, a second heat exchanger in the air duct, means for passing exhaust gases from the engine through said second heat exchanger and thence through the water heater, means for by-passing the exhaust gases from the engine around the second heat exchanger, and electric heating means in the air duct operated by the generator.

2. A heating system of the character described comprising an air duct connected to the atmosphere in an enclosure, means for causing air to flow from the enclosure through the air duct and to return to the enclosure, a water heater, an internal combustion engine, an electric generator driven by the engine, a first heat exchanger in the air duct, means for passing water from the water jackets of the engine through said heat exchanger, a second heat exchanger in the air duct, means for passing exhaust gases from the engine through said second heat exchanger and thence through the water heater, means for by-passing the exhaust gases from the engine around the second heat exchanger, electric resistance heating coils in the air duct connected to the generator, and thermostatically controlled means actuated in response to the temperature in the enclosure for making and breaking the circuit connecting the coils with the generator.

3. A heating system of the character described comprising an air duct connected to the atmosphere in an enclosure, means for causing air to flow from the enclosure through the air duct and to return to the enclosure, a water heater, an internal combustion engine, an electric generator driven by the engine, a first heat exchanger in the air duct, means for passing water from the water jackets of the engine through said heat exchanger, a second heat exchanger in the air duct, means for passing exhaust gases from the engine through said second heat exchanger and thence through the water heater, means for by-passing the exhaust gases from the engine around the second heat exchanger, electric resistance heating coils in the air duct connected to the generator, thermostatically controlled means actuated in response to the temperature in the enclosure for making and breaking the circuit connecting the coils with the generator, means for spraying water into the air in the duct to condition the air, and means for controlling the engine in response to the load on the generator.

4. The method of supplying heat, light and power which comprises operating an electric generator by an internal combustion engine to produce electric energy for heat, light and power, circulating air through an enclosure, transferring to the air heat developed by the engine and heat produced by electric energy generated by the generator, and controlling the engine and generator to control the temperature of the air in the enclosure.

5. The method of supplying heat, light and power which comprises operating an electric generator by an internal combustion engine to produce electric energy for heat, light and power, circulating air through an enclosure, transferring to the air heat developed by the engine and heat produced by electric energy generated by the generator, transferring to a fluid heater heat developed by the engine, and controlling the engine and generator to control the temperature of the air in the enclosure.

6. A heating system comprising an internal combustion engine, an air heater for heating the atmosphere of an enclosure, a water heater, means for passing water from the water jackets of the engine through the air heater in heat exchange relationship with the atmosphere therein, and means for passing exhaust gases from the engine through the water heater.

7. A heating system comprising an internal combustion engine, an air heater for heating the atmosphere of an enclosure, a water heater, means for passing water from the water jackets of the engine through the air heater in heat exchange relationship with the atmosphere therein, and means for passing exhaust gases from the engine through the air heater for transfer of heat to the atmosphere therein and also through the water heater.

8. A heating system comprising an internal combustion engine, an air heater for heating the atmosphere of an enclosure, a water heater, means for passing water from the water jackets of the engine through the air heater in heat exchange relationship with the atmosphere therein, means for passing exhaust gases from the engine through the air heater for transfer of heat to the atmosphere therein and also through the water heater, and means for by-passing exhaust gases around the air heater.

9. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for passing water from the water jackets of the engine through the heat exchanger to cause heat to be transferred to the air flowing through the duct, and electric heating means in the air duct operated by the generator.

10. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, and electric heating means operated by the generator in the air duct.

11. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, and means for controlling the heat developed by the engine and the electricity generated by the generator to maintain a substantially constant predetermined temperature in the enclosure.

12. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, means for controlling the heat delivered by the electric heating means, and means for controlling the engine in response to the load on the generator.

13. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, means for controlling the electric heating means, and means for controlling the engine in response to the heat produced by the electric heating means.

14. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, and means for varying the heat produced by the electric heating means.

15. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, and means for controlling the engine in response to the heat produced by the heating means.

16. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, and means for conditioning the air flowing through the air duct.

17. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, means for transferring through the heat exchanger heat developed during the operation of the engine to the air flowing through the duct, electric heating means operated by the generator in the air duct, and means for spraying water into contact with the air flowing through the duct to condition the air.

18. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, a water heater, means for transferring through the heat exchanger, heat developed during the operation of the engine to the air flowing through the duct, means for transferring to the water heater, heat developed during the operation of the engine, electric heating means in the air duct operated by the generator, and means for controlling the engine in response to the load on the generator.

19. A heating system comprising an air duct connected to the atmosphere in an enclosure, means for causing air to flow from the enclosure through the air duct and to return to the enclosure, an internal combustion engine, an electric generator driven by the engine, a heat exchanger in the air duct, a water heater, means for transferring through the heat exchanger, heat developed during the operation of the engine to the air flowing through the duct, means for transferring to the water heater, heat developed during the operation of the engine, and electric heating means in the air duct operated by the generator.

20. A heating, lighting and power system for buildings and the like comprising an internal combustion engine, an electric generator driven by the engine, means for transferring to the atmosphere in the building heat generated by the engine during operation, means for transferring to the atmosphere in the building heat produced by the electrical energy generated by the generator comprising electric heating coils in circuit with the generator, means causing the engine to operate at approximately constant speed irrespective of load variations on the engine, and thermostatic means for automatically making and breaking said circuit to control the heat transferred to the atmosphere in the building by the electric heating coils and the engine to thereby maintain a substantially constant predetermined temperature in the building.

21. A heating, lighting and power system for buildings and the like comprising an internal combustion engine, an electric generator driven by the engine, means for transferring to the atmosphere in the building heat contained in the exhaust gases and in the water circulating through the water jackets of the engine, means for transferring to the atmosphere in the building heat produced by the electrical energy generated by the generator comprising electric heating coils in circuit with the generator, means causing the engine to operate at approximately constant speed irrespective of load variations on the engine, and thermostatic means for automatically making and breaking said circuit to control the heat transferred to the atmosphere in the building by the electric heating coils and the engine to thereby maintain a substantially constant predetermined temperature in the building.

22. A heating, lighting and power system for buildings and the like comprising an internal combustion engine, an electric generator driven by the engine, means for transferring to the atmosphere in the building heat generated by the engine during operation, means for transferring to the atmosphere in the building heat produced by the electrical energy generated by the generator comprising electric heating coils in circuit with the generator, means causing the engine to operate at approximately constant speed irrespective of load variations on the engine, and a thermostat in the building arranged to automatically make and break the generator-heating coil circuit and thereby vary the load on the engine and consequently vary the quantities of heat contained in the exhaust gases of the engine and in the water circulating through the water jackets of the engine, whereby the quantity of heat transferred to the atmosphere in the building is varied so that a substantially constant predetermined temperature is maintained in the building.

23. A heating, lighting and power system for buildings and the like comprising an internal combustion engine, an electric generator driven by the engine, means for transferring to the atmosphere in the building heat generated by the engine during operation, means for transferring to the atmosphere in the building heat produced by the electrical energy generated by the generator comprising electric heating coils in circuit with the generator, means causing the engine to operate at approximately constant speed irrespective of load variations on the engine, and thermostatic means for automatically controlling the heat developed by the engine and the electricity generated by the generator to maintain a substantially constant predetermined temperature in the building.

24. A heating, lighting and power system for buildings and the like comprising an internal combustion engine, an electric generator driven by the engine, means for transferring to the atmosphere in the building heat generated by the engine during operation, means for transferring to the atmosphere in the building heat produced by the electrical energy generated by the generator comprising electric heating coils in circuit with the generator, means causing the engine to operate at approximately constant speed irrespective of load variations on the engine, means for conducting electrical energy from the generator to the building for light and power purposes, and thermostatic means for automatically controlling the heat developed by the engine and the electricity generated by the generator to maintain a substantially constant predetermined temperature in the building.

OGDEN MINTON.